United States Patent
Soh et al.

(10) Patent No.: US 6,539,028 B1
(45) Date of Patent: Mar. 25, 2003

(54) CSMA/CD WIRELESS LAN

(75) Inventors: Kok Hong Soh, Singapore (SG); Hang Poh Chia, Singapore (SG); Kapil Dakhane, Singapore (SG); Choon Shyan Lim, Singapore (SG)

(73) Assignee: Kent Ridge Digital Labs, Singapore (SG)

( * ) Notice: Subject to any disclaimer, the term of this patent is extended or adjusted under 35 U.S.C. 154(b) by 0 days.

(21) Appl. No.: 09/453,686

(22) Filed: Dec. 3, 1999

(30) Foreign Application Priority Data

Dec. 9, 1998 (SG) .......................... 9805368-9

(51) Int. Cl.⁷ .......................... H04L 12/413
(52) U.S. Cl. .......................... 370/445
(58) Field of Search .......................... 370/310, 328, 370/348, 338, 349, 445, 447, 448

(56) References Cited

U.S. PATENT DOCUMENTS

| | | |
|---|---|---|
| 4,210,780 A | 7/1980 | Hopkins et al. |
| 4,894,819 A | 1/1990 | Kondo et al. |
| 4,959,874 A | 9/1990 | Saruta et al. |
| 5,251,203 A | 10/1993 | Thompson |
| 5,276,703 A | 1/1994 | Budin et al. |
| 5,289,306 A | 2/1994 | Hirohashi et al. |
| 5,369,639 A | 11/1994 | Kamerman et al. |
| 5,402,420 A * | 3/1995 | Kobayashi .......... 370/212 |
| 5,553,076 A | 9/1996 | Behtash et al. |
| 5,657,326 A | 8/1997 | Burns et al. |
| 5,673,031 A | 9/1997 | Meier |
| 5,754,947 A | 5/1998 | Tanabe et al. |
| 5,802,041 A * | 9/1998 | Waclawsky et al. ..... 370/245 |
| 5,854,900 A * | 12/1998 | Kalkunte et al. .......... 709/238 |
| 6,118,787 A * | 9/2000 | Kalkunte et al. .......... 370/445 |
| 6,141,327 A * | 10/2000 | Kalkunte et al. .......... 370/252 |

FOREIGN PATENT DOCUMENTS

| | | |
|---|---|---|
| EP | 0 483 548 B1 | 3/1996 |
| EP | 0 901 252 A2 | 3/1999 |
| WO | WO 98/20648 | 5/1998 |

OTHER PUBLICATIONS

Valadas et al., "Hybrid (Wireless Infrared/Coaxial) Ethernet Local Area Networks"; IEEE;1992; pp. 21–29.

* cited by examiner

Primary Examiner—Ajit Patel
(74) Attorney, Agent, or Firm—Nath & Associates PLLC; Harold L. Novick; Marvin C. Berkowitz

(57) ABSTRACT

A wireless carrier sense multiple access/collision detection (CSMA/CD) communication system (1) is disclosed which includes a repeater station (R; 10) and a plurality of terminal stations (E, F, G; 30). A wireless uplink communication channel (Fu) provides for one-way communications between each terminal station and the repeater station and a wireless downlink communication channel (Fd) provides for one-way communications between the repeater station and each of the terminal station. The uplink and downlink communication channels operate at different transmission wavelengths. A bit pattern (18) received by the repeater station via the uplink channel is retransmitted via the downlink channel. A collision detection arrangement (48) is provided within each terminal station for comparing a bit pattern (38) transmitted from that terminal station via the uplink channel with a bit pattern (46) received from the repeater station via the downlink channel, to determine if the terminal station has unambiguous access to communications within the system.

21 Claims, 3 Drawing Sheets

CSMA/CD WIRELESS LAN

FIELD OF THE INVENTION

The present invention relates to wireless local area networks and, in particular, to an effective implementation of CSMA/CD technology in such environments.

BACKGROUND ART

Local area networks (LAN's) are now commonplace and efforts to reduce their installation and upgrade costs have pursued the use of wireless technology, thereby facilitating affordable and convenient equipment placement and the like.

In normal wireless local area networks, collision detection is a difficult problem due to the so-called "hidden terminal problem". The impact of the hidden terminal problem is illustrated in FIG. 1 where A, B and C represent terminals and the circles represent the respective communication ranges of the terminals. When terminal A is communicating with terminal B (on the same frequency), terminal C cannot receive the signal from terminal A. Hence, terminal C might start to transmit to terminal B because terminal C is not aware of any signal being transmitted from terminal A. When this happens, the communication from terminal A to terminal B will be lost because of jamming induced by the signal transmitted from terminal C. In typical wireless networks, there are some common characteristics:

(a) the transceivers of mobile stations/terminals are generally low power (to conserve battery life), which generally limits their transmission range; and (b) the transceivers of base stations can generally be of higher power because the power being consumed is traditionally from higher energy power supplies (ie. AC mains or large capacity batteries).

Hence, collision detection between coincident transmissions is almost impossible to prevent because of the hidden terminal problem.

Most existing methods of wireless local area networking are based on either TDMA (Time Division Multiple Access) or CSMA/CA (Carrier Sense Multiple Access/Collision Avoidance). Typical TDMA systems are exemplified by the products of Spectrix Corporation of the USA. The IEEE 802.11 wireless LAN standard uses a CSMA/CA method to contend for access to the medium.

The IEEE 802.3 standard, more commonly known as "Ethernet", has been known for more than a decade and is a widely implemented LAN standard in the wired networking domain. Ethernet is a multiple access technique based on CSMA/CD (ie. collision detection) because the wired domain is a very suitable environment for collision detection.

In the IEEE 802.11 standard, a terminal that has a data packet to transmit will first send a "Ready To Send" (RTS) control packet and then wait to receive a "Clear to Send" (CTS) control packet from the intended receiver terminal to ensure that the medium is free. If there is no CTS packet, the sender will perform an exponential back-off before attempting to again acquire access. Any other terminal in the communication range of either the sender or the receiver will hear either the RTS or CTS control packets and hence know that the medium will be busy for a period of time, and, as a consequence, those other terminals will not contend for the medium during this time. However, it has been found that the performance throughput of terminals at the edges of range of other terminals suffer because their RTS packets are usually not "heard" by the centrally positioned terminals. This is because the edge terminals cannot hear the terminals at the opposite edge that also transmit RTS packets towards the central terminals at the same time. Thus, when these terminals back-off, they will become synchronized in their attempts to transmit the RTS packet. Moreover, this method does not work when multicast addressed packets are attempted to be sent because there can be more than one receiver. Collision avoidance also suffers from the fact that different terminals can have different transmitter efficiencies due to varying power levels.

TDMA systems tend to be more complicated because of the timing requirements of the system. The base station needs to be "smarter" as they need to handle registration of new terminals that move within range of the base station.

CSMA/CD is acknowledged to be a simple and very efficient multiple access technique in wired networking, especially under heavy loads. CSMA/CD can achieve above 70% efficiency under heavy loads compared to CSMA/CA that can only achieve up to 30% efficiency under heavy loads. As explained earlier, the "hidden terminal problem" makes the wireless environment unsuitable to implement CSMA/CD.

SUMMARY OF THE INVENTION

It is an object of the present invention to substantially overcome, or at least ameliorate, one or more problems with prior arrangements.

In accordance with one aspect of the present invention there is disclosed a wireless carrier sense multiple access/ collision detection (CSMA/CD) communication system comprising:

a repeater station;

at least one terminal station;

a wireless uplink communication channel for one-way communications between each terminal station and the repeater station;

a wireless downlink communication channel for one-way communications between the repeater station and each terminal station, the uplink and downlink communication channels being operable at different transmission wavelengths, wherein a bit pattern received by the repeater station via the uplink channel is retransmitted via the downlink channel; and a collision detection arrangement within each terminal station for comparing a bit pattern transmitted from the terminal station via the uplink channel with a bit pattern received from the repeater station via the downlink channel, to determine if the terminal station has unambiguous access to communications within the system.

In accordance with another aspect of the present invention there is disclosed a method of implementing a CSMA/CD communications protocol in a wireless network having a plurality of terminal stations, the method comprising the steps of:

providing a repeater station for receiving wireless communications on an uplink channel and retransmitting the same on a downlink channel having a communications wavelength different from the uplink channel;

enabling wireless communications for each terminal station via the uplink channel to the repeater station and to each terminal station from the repeater station via the downlink channel; and performing collision detection within each terminal station by comparing a bit pattern transmitted by the terminal station with a bit pattern received by the terminal station such that if the two bit patterns coincide, no collision is detected.

Other aspects of the present invention are also disclosed.

The present invention acts to improve the wireless environment to an extent that will make it suitable to implement CSMA/CD. This improved environment allows the use of existing technologies based on the IEEE 802.3 Ethernet standard to implement efficient wireless LANs.

The use of the repeater station based on different transmitter and receiver wavelengths acts to solve the hidden terminal problem.

BRIEF DESCRIPTION OF THE DRAWINGS

A number of embodiments of the present invention will now be described with reference to the drawings in which.

DETAILED DESCRIPTION

Figure 1:
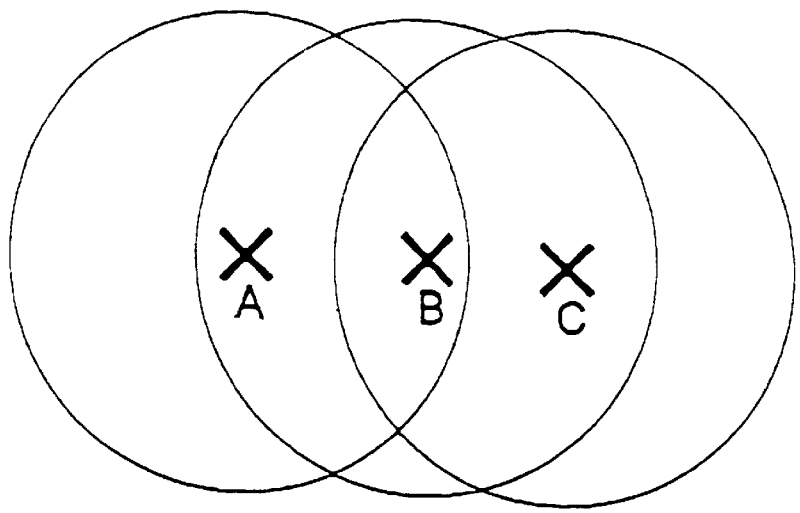
FIG. 1 illustrates the hidden terminal problem of the prior art.
Figure 2:
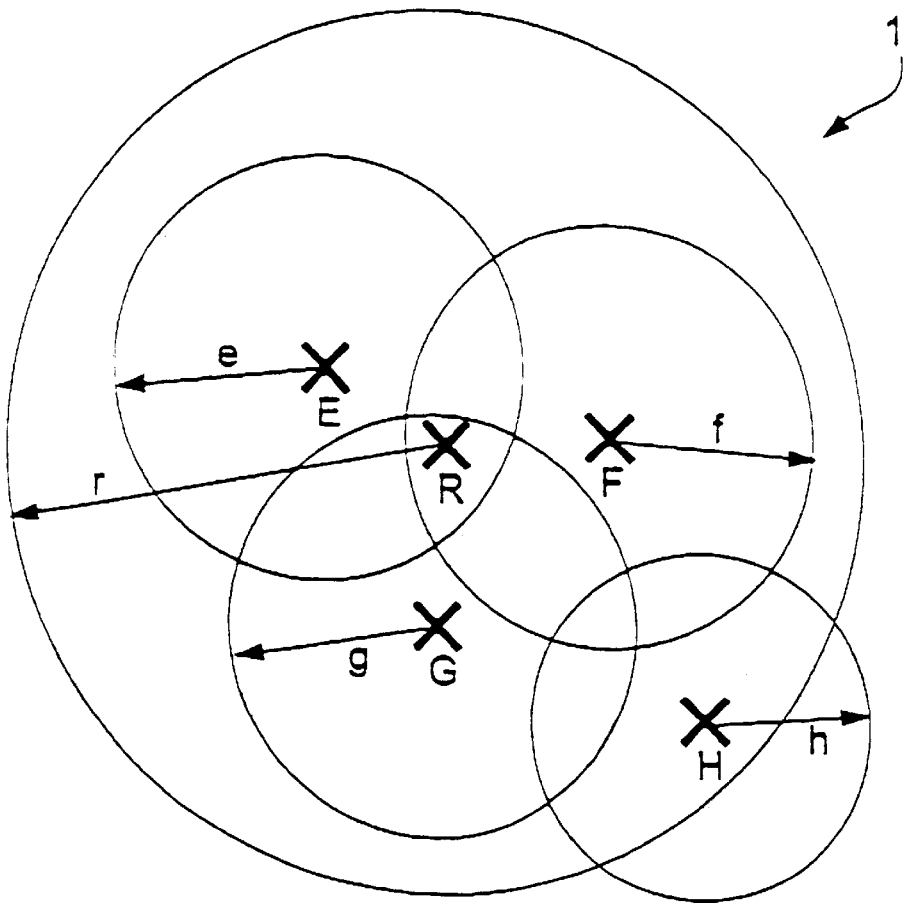
FIG. 2 depicts a wireless LAN arrangement according to the preferred embodiment.

FIG. 2 shows a CSMA/CD system 1 configured according to the preferred embodiment in which a repeater station R is seen together with one or more fixed or mobile stations/terminals E, F, G, and H. Each of the repeater base station R and terminals E–H incorporate wireless transceivers each having a corresponding communication ranges r, e, f, g, and h respectively. As will be appreciated from FIG. 2, the repeater R is preferably arranged at a fixed location and thus is able to derive its transmission power from a substantial source and thus it incorporates the largest of the ranges (r). Further, as illustrated, each of the terminals E, F, G, and H are located within the transmission area of the repeater station R and, for example, mobile station H has a communication area which extends beyond that of the repeater station R.

Each of the stations shown in FIG. 2 incorporates a wireless transceiver, traditionally implemented using radio frequency communications or optical (eg. infrared) communications that is able to transmit and receive signals simultaneously but each at different communication wavelengths. This may be interpreted as carrier frequencies or RF implementations. For the sake of generality, will be termed herein as communication channels. The purposes of this description Fd is to be taken to be a downlink channel whereas Fu is taken to be an uplink channel, with Fd and Fu being different.

The repeater R receives information on the uplink channel Fu and transmits information on the downlink channel Fd. Further, although illustrated as part of a wireless LAN, the repeater base station R may be connected to a fixed line local area network in which case, it may also function as a LAN switch. In operation the repeater base station R demodulates each bit of data it receives on the uplink channel and retransmits a further modulated version of the same on the downlink channel without any delay.

Figure 3:
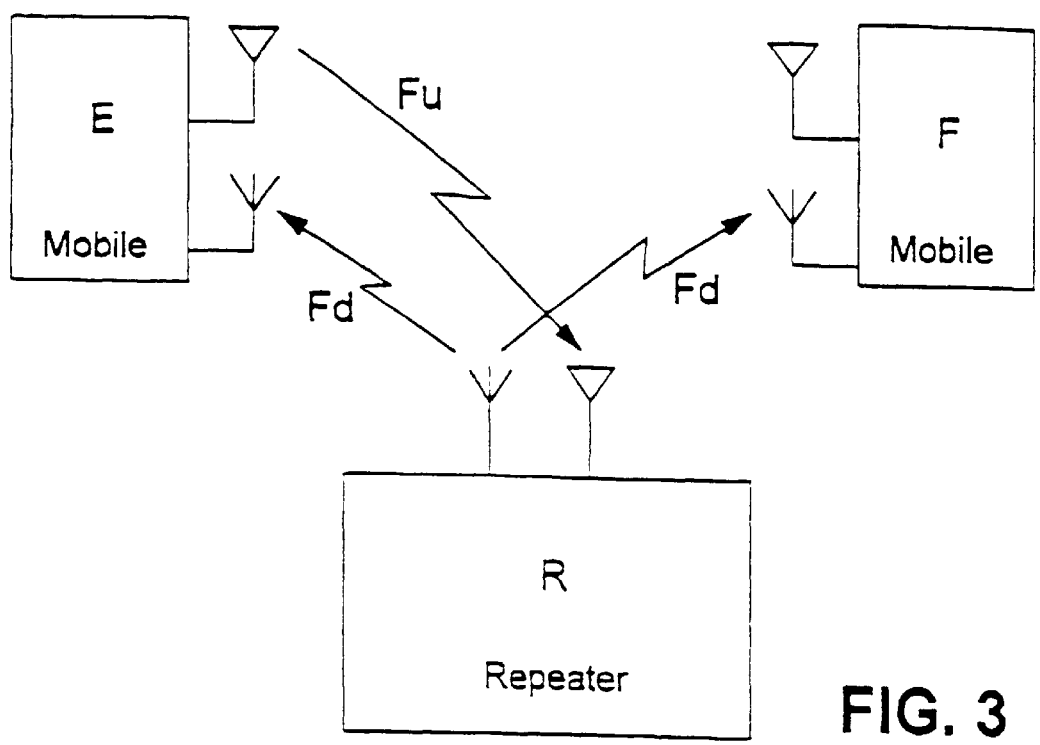
FIG. 3 shows one configuration of mobile stations and repeater according to the preferred embodiment.

FIG. 3 shows a basic configuration having terminals E and F, which may be either fixed or mobile, and one repeater base station R. When any terminal has data to transmit, it will "listen" on the downlink channel Fd to ensure that the wireless medium is free. If the medium is free, the terminal, in this case terminal E, transmits a preamble pattern on the uplink channel Fu. The repeater base station R receives the preamble pattern and decodes the pattern bit-by-bit. As each bit is decoded, the base station R re-transmits this the bit, and thus the pattern, on the downlink channel Fd. The terminal E will, at the same time, listen to the feedback of the preamble on the downlink channel Fd to ensure that there is no collision with another terminal.

It will be appreciated from the above that the uplink channel and downlink channel are each essentially unidirectional, or "one-way" channels. The uplink channel Fu provides a single communication path from each of the terminal stations (E, F, G, etc) to the repeater station R. The downlink channel Fd provides a single communication path from the repeater station R to the terminal stations (E, F, G, etc). Because of the possible distribution of the terminal stations E, F, G about the repeater station R, transmission and reception at the repeater station R at least is typically omnidirectional, this term describing the operative nature of the transmit and receiving transducers, rather than the nature of the communication paths formed thereby. Depending on the location (fixed or mobile) of the terminal stations, their respective transmit and receive transducers may have an omnidirectional or unidirectional response.

After the preamble has been transmitted and the terminal E has received a properly formatted preamble on the downlink channel Fd, the terminal E can assume that there was no collision and can then transmit its information packet to the repeater base station R on the uplink channel Fu. The repeater station R then re-broadcasts the information packet back on the downlink channel Fd. This separate feedback downlink channel allows the terminal E to verify that the packet was correctly transmitted. Note that with this embodiment there is always at least a 1-bit delay in the bit pattern between transmission by the terminal E and subsequent reception on the downlink channel. If there was a collision during the transmission of the preamble pattern with another terminal, the terminals involved in the collision perform an Ethernet-like random back-off before attempting to retransmit the packet. Preferably, after 16 retries (as in the Ethernet standard), the terminal E will give up and throw away the packet.

Figure 4:
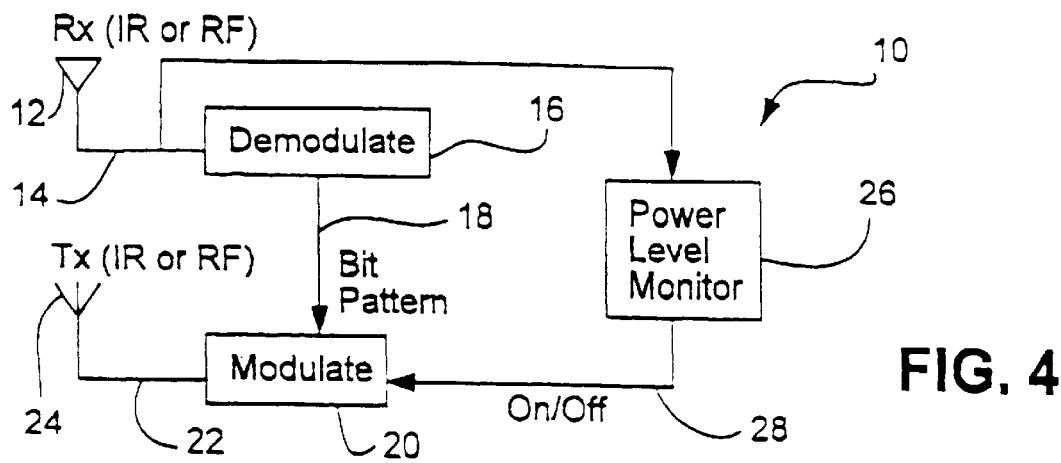
FIG. 4 is a schematic block diagram representation of a repeater station according to one embodiment.

FIG. 4 shows an exemplary arrangement for a repeater station 10 which, for example, may be used in the embodiment of FIG. 2. Repeater station 10 includes a receiving transducer 12 such as a radio frequency antenna or infra-red detector suitable to the particular wireless environment being implemented. A received signal is communicated via a connection 14 to each of a demodulator 16 and a power level monitor 26. The demodulator 16 demodulates the receive signal to derive a bit pattern 18 which is communicated to a modulator 20. The power level monitor 26 detects the power level of the received signal 14 and, if that power level exceeds a predetermined value, the modulator 20 is enabled through the application of an on/off signal 28. When the modulator 20 is enabled, the bit pattern 18 is modulated and output via a line 22 to a transmitting transducer 24, typically either an RF antenna or an infra-red emitter, again depending upon the wireless environment being implemented. As noted above, each of the receiving transducer 12 and transmitting transducer 24 operate at different wavelengths.

Figure 5:
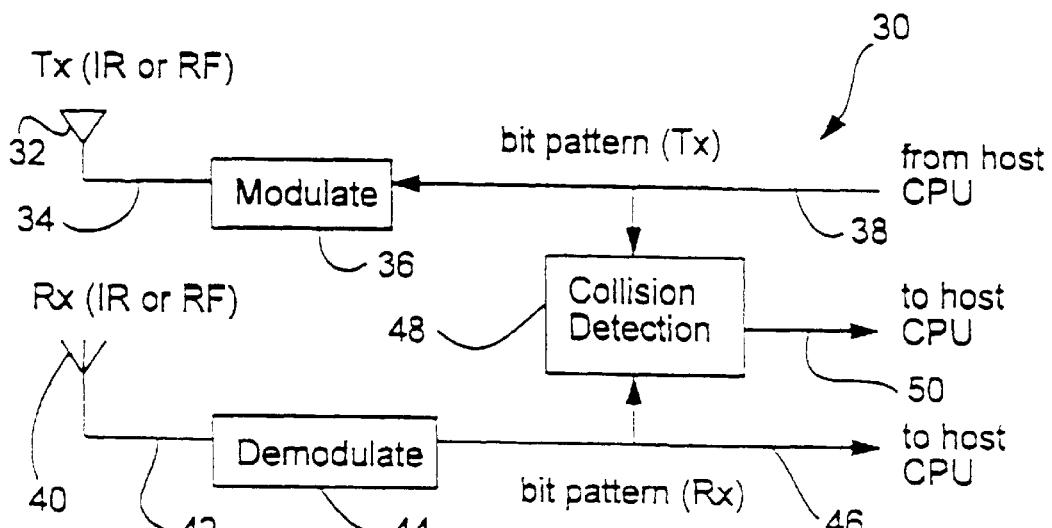
FIG. 5 is a schematic block diagram representation of a terminal station according to the embodiment of FIG. 4.

FIG. 5 shows an arrangement of a terminal station 30 which may be any one of the terminals E, F, G or H shown in FIG. 2. The terminal 30 may be either mobile or arranged at a fixed location within the communication area of the repeater 10. The terminal station 30 includes a transmitting transducer 32 arranged to operate at the same wavelength as the receiving transducer 12 of the repeater terminal 10. A signal 34 supplied to the transmitting transducer 32 is derived from a modulator 36 which modulates a transmission bit pattern 38 derived from a host central processing unit (CPU) (not illustrated). The transmission bit pattern is also input to a collision detection circuit 48. The terminal 30 also includes a receive transducer 40 operable at the same wavelength of the transmitting transducer 24 which provides a received signal 42 to a demodulator 44. The demodulator 44 decodes the received signal 44 to derive a received bit pattern 46 which is supplied to the host CPU and also to the collision detection circuit 48. The collision detection circuit 48 performs a bit-by-bit comparison between the transmission bit pattern and the received bit pattern and outputs a signal 50 to the host CPU when a collision between those bit patterns is detected.

Figure 7:
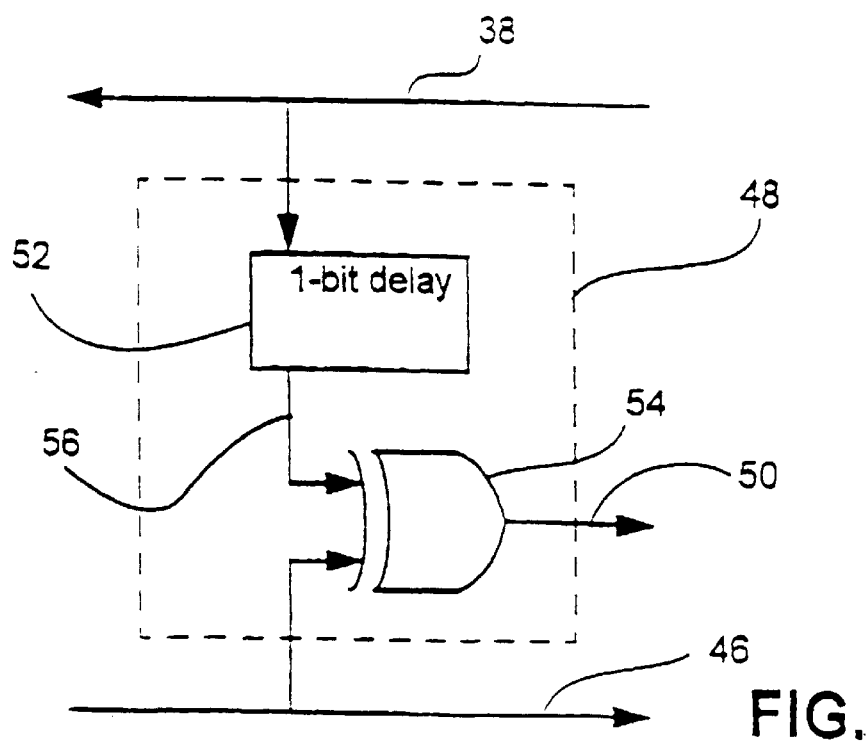
FIG. 7 schematically illustrates a collision detection arrangement useful in the arrangement of FIG. 5.
Figure 6:
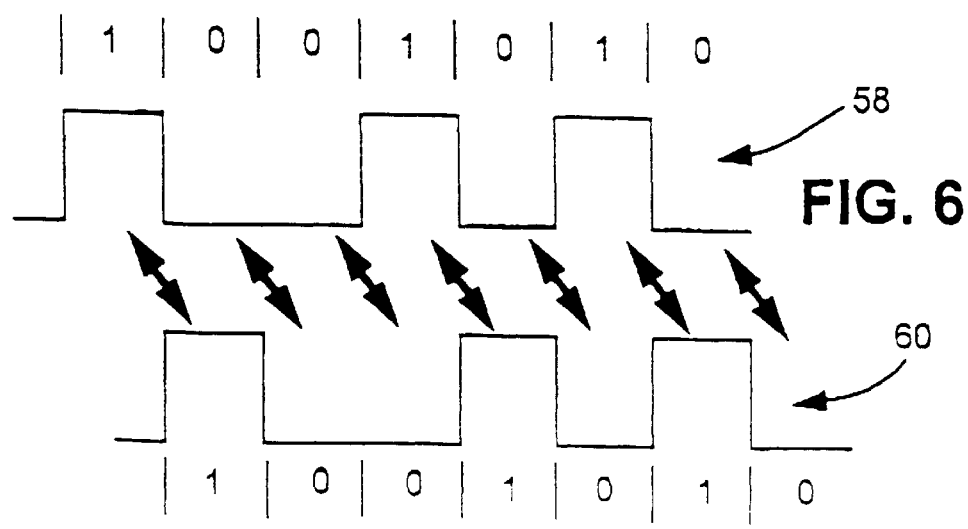
FIG. 6 illustrates the bit patterns seen at the terminal of FIG. 5.

FIG. 6 illustrates an arrangement of a specific transmitted bit pattern 58 and a corresponding received bit pattern 60. As is apparent from FIG. 6, for the specific bit pattern transmitted, the receive bit pattern is seen delayed by a single bit period. As a consequence, collision detection can be performed through imparting a delay into the transmitted bit pattern. This is seen in FIG. 7 where a simplified arrangement of the collision detection circuit 48 is shown where the transmission bit pattern 38 is supplied to a one-bit delay circuit 52 which outputs a delayed signal 56 to an exclusive-OR gate (XOR) gate 54, also input with the received bit pattern 46. In this fashion, where the transmission bit pattern 38 corresponds with the received bit pattern 46, the output 50 of the collision detection circuit 48 will remain at a logical low output. Where a collision detected (ie. a difference exists between the transmitted bit pattern and received bit pattern), the output 50 will become enabled thereby signalling to the host CPU that a collision has occurred. The CPU is then able to take appropriate corrective action to ensure the proper handling of received signals, for example using known Ethernet protocols.

In FIG. 2, terminal H does not belong to the network even though it falls within the transmission range of the base station R. This is because the transmissions of terminal H are too weak (for example, in the case of low battery power) to be "heard" by station R. Terminal H does not interfere with the performance of the network because its transmission cannot be "heard" by repeater R or the other terminals E, F, G. This is to be contrasted with the case in IEEE 802.11 implementations where uplink and downlink channels use the same frequency, which results in weak powered terminals interfering with the performance of adjacent terminals.

It will be apparent from the foregoing that in the preferred embodiment, all communications between terminal stations (E, F, G, etc.) occur via the repeater station R. In this configuration, it is not possible for any one terminal station to directly communicate with another terminal station. This is because of the repeater station R is configured to receive signals transmitted on the uplink channel Fu and the terminal stations (E,F,G) are the only devices configured to receive signals on the downlink channel Fd.

If, in the embodiment of FIG. 3, the terminal stations E and F transmit on their uplink channels Fu simultaneously, the repeater station R will receive a bit pattern corresponding to the conglomeration of the transmitted bit patterns from each of the terminal stations E and F. The conglomerated bit pattern will be retransmitted on the downlink channel Fd for reception by the terminal stations E and F. In each terminal station E and F a collision will be detected because of the conglomerated bit pattern being distinct from each of the originating bit patterns in the respective terminals stations E and F. This is interpreted by the respective terminal stations CPU to enforce an Ethernet-like backoff before attempting to re-transmit.

It is apparent from the foregoing that a CSMA/CD wireless communication network is described which allows for a communication protocol to be implemented whilst avoiding the hidden terminal problem. By providing a repeater station able to communicate on separate uplink and downlink channels, individual terminals may implement CSMA/CD protocol to ensure unambiguous communication are effected through accurately identifying collisions between transmission. The different uplink and downlink channels may be implemented through using different carrier frequencies in an RF wireless environment or alternatively using different communication wave lengths in an infra-red environment.

In the preferred embodiments, each of the wave lengths of the uplink and downlink channel should be different, for each of the RF and IR implementations. For RF implementations, typical carrier frequencies may be 900 MHz, 1.8 GHz, 2.4 GHz may be used, giving communication wavelengths of about 33 cm, 16.7 cm and 12.5 cm, respectively. Any one of these wavelengths may be used for a respective uplink or downlink channel. Those skilled in the art will appreciate that implementation at any of these wavelengths will involve modulating a carrier wave at a modulation rate determined by the particular communication standard established within the network.

For infra-red implementations, the uplink and downlink channels are implemented using different wavelengths such as 1100 nanometres and 850 nanometres. In these implementations, ON/OFF keying of the infra-red source is used and this can be performed at a predetermined modulation rate or for example at the data rate of the bit pattern.

In this regard, the present inventors have determined that to use different modulation of the same wavelengths IR sources, results in a system which does not provide for the unambiguous detection (reception) of infra-red signals. Although transmission may occur without any ambiguity, because of scattering of light and the short wave lengths thereof being highly susceptible to reflection and refraction, unambiguous detection is practically impossible where the same wave length is used for both uplink and downlink channels and reliance is only placed upon modulation techniques to distinguish between those channels. This problem is addressed in the described IR embodiment where different wavelengths are used for each of the uplink and downlink channels.

The foregoing describes only a number of embodiments of the present invention and modifications, can be made thereto without departing from the scope of the present invention.

For example, the communications channels may be formed of mixed technologies, such as RF for the uplink channel and IR for the downlink channel, or vice versa.

What is claimed is:

1. A wireless carrier sense multiple access/collision detection (CSMA/CD) communication system comprising:

a repeater station;

at least one terminal station;

a wireless uplink communication channel for one-way communications between each said terminal station and said repeater station;

a wireless downlink communication channel for one-way communication between each said repeater station and each said terminal station, said uplink and downlink communication channels being operable at different transmission wavelengths, wherein a bit pattern received by said repeater station via said uplink channel is retransmitted via said downlink channel; and a collision detection arrangement within each said terminal station having means for introducing a delay in the transmission bit pattern by a predetermined period to correspond with an anticipated reception of a re-transmitted bit pattern emitted from said repeater station, and comparison means for comparing a delayed bit pattern, on a bit-by-bit basis, with a received bit pattern to determine if said terminal station has unambiguous access to communications within said system.

2. A system according to claim 1, wherein said delay means imparts a 1-bit delay to said transmission bit pattern to form said delayed bit pattern.

3. A system according to claim 1, wherein said comparison means comprises an exclusive-OR arrangement.

4. A system according to claim 1, wherein each said communication channel comprises a radio frequency channel.

5. A system according to claim 1, wherein each said communication channel comprises an optical channel.

6. A system according to claim 1, wherein one of said communication channels comprises a radio frequency channel and the other of said communication channels comprises an optical channel.

7. A system according to claim 1, wherein said repeater station comprises:

a demodulator for demodulating a signal received via said uplink channel to form a demodulated bit pattern;

a modulator for modulating said demodulated bit pattern for transmission via said downlink channel; and a power level monitor for detecting a received power of said received signal such that when said received power falls below a predetermined level, said power level monitor disables operation of said modulator to cease transmission by said repeater station.

8. A system according to claim 1, wherein each said terminal station comprises a modulator for modulating a transmission bit pattern for emission via said uplink communication channel, a demodulator for demodulating a signal received via said downlink communication channel to derive a received bit pattern and said collision detection arrangement for determining a communications collision according to a CSMA/CD protocol between said transmission bit pattern and said received bit pattern.

9. A wireless local area network communication system comprising:

a repeater station having a (first) receiving transducer forming part of an uplink communication channel, a (first) transmitting transducer forming part of a downlink communication channel, a (first) demodulator for demodulating a signal received via said first receiving transducer to derive a (repeatable) bit pattern, a (first) modulator for modulating said repeatable bit pattern for emission via said first transmitting transducer, and a power level monitor for determining a received strength of said signal and for enabling operation of said first modulator when said received strength exceeds predetermined value;

a plurality of terminal stations, each said terminal station comprising a (second) transmitting transducer forming part of said uplink communication channel, a (second) receiving transducer forming part of said downlink communication channel, a (second) modulator arranged to modulate a transmission bit pattern for emission via said second transmitting transducer, a (second) demodulator arranged to demodulate a signal received via said second receiving transducer to form a received bit pattern, and a collision detection arrangement having a delay circuit for delaying said transmission bit pattern by a predetermined period to correspond with an anticipated reception of a re-transmitted said bit pattern, and a comparator for comparing the delayed transmission bit pattern with said received bit pattern on a bit-by-bit basis to determine a collision between transmissions initiated by said terminal station and another of said terminal stations, wherein each of said communication channels utilize different communication wavelengths.

10. A system according to claim 9, wherein each of said communication channels are radio frequency channels operating a different carrier frequencies.

11. A system according to claim 9, wherein each of said communication channels are optical channels operating at different wavelengths.

12. A system according to claim 11, wherein said optical channels comprise infra-red channels and said bit patterns cause ON/OFF keying of infra-red transducers a corresponding wavelength.

13. A system according to claim 9, wherein said delay circuit imports a 1-bit period delay to said transmission bit pattern.

14. A system according to claim 9, wherein said comparator comprises an exclusive-OR circuit.

15. A system according to claim 11, wherein each said terminal station further comprises a control means for generating said transmission bit pattern and for interpreting the corresponding said received bit pattern and a collision detection signal from said collision detection arrangement and for implementing a CSMA/CD communications protocol with each other of said terminal stations.

16. A system according to claim 15 wherein said control means comprises part of said collision detection arrangement.

17. A system according to claim 15, wherein said protocol accords with the IEEE 802.3 standard.

18. A system according to claim 9, wherein one of said communication channels comprises a radio frequency channel, and the other of said channels comprise an optical channel.

19. A system according to claim 18, wherein said optical channel is an uplink channel, and said radio frequency channel is said downlink channel.

20. A method of implementing a CSMA/CD communications protocol in a wireless network having a plurality of terminal stations, said method comprising the steps of:

providing a repeater station for receiving wireless communications on an uplink channel and retransmitting the same on a downlink channel having a communications wavelength different from the uplink channel;

enabling wireless communications for each said terminal station via said uplink channel to said repeater station and to each said terminal station from said repeater station via said downlink channel; and performing collision detection within each said terminal station by comparing a delayed form of a bit pattern transmitted by said terminal station with a bit pattern received by said terminal station, wherein said delay is a predetermined period corresponding with an anticipated reception of a retransmitted said bit pattern, and such that if the two bit patterns coincide, no collision is detected.

21. A method according to claim 20, wherein said predetermined period is at least a 1-bit period.

* * * * *